July 15, 1941.  H. ROSENBERG  2,249,329
BEARING UNIT
Filed Aug. 29, 1939
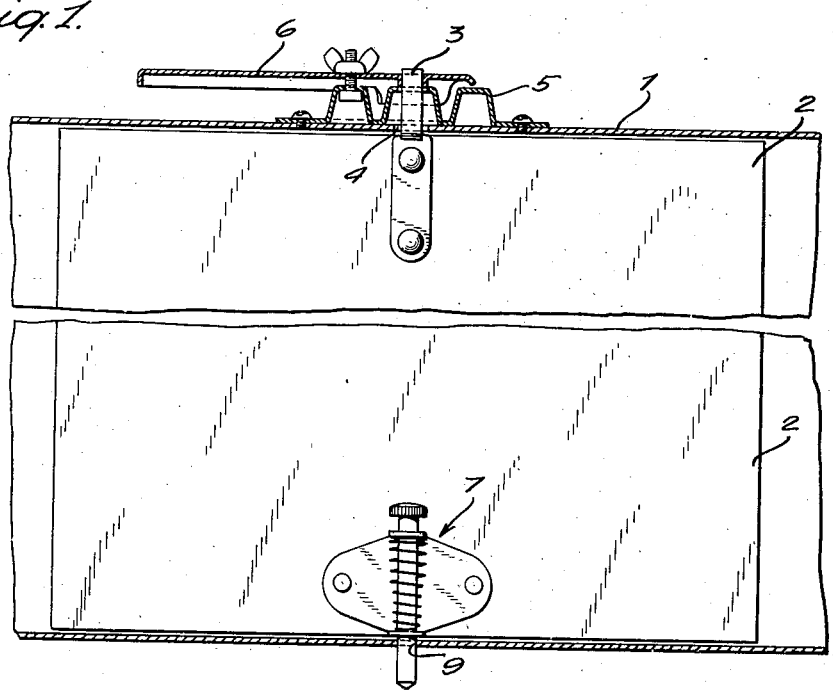
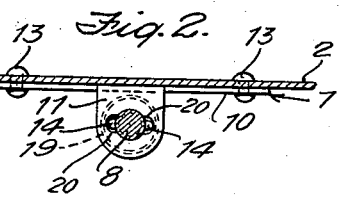
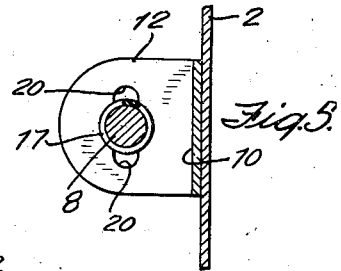
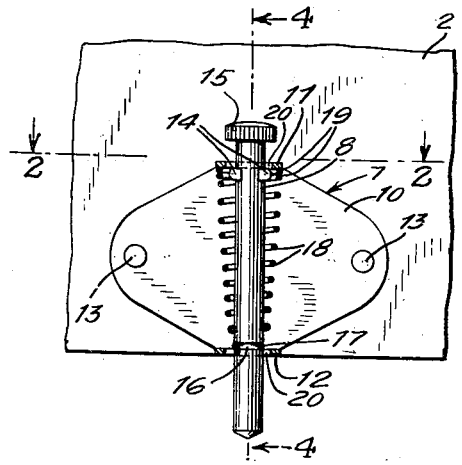
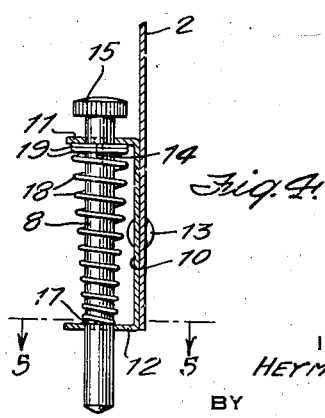
INVENTOR
HEYMAN ROSENBERG
BY
Clarence M. Crews
ATTORNEY Patented July 15, 1941

2,249,329

UNITED STATES PATENT OFFICE 2,249,329

BEARING UNIT

Heyman Rosenberg, New York, N. Y.

Application August 29, 1939, Serial No. 292,401

1 Claim. (Cl. 16—176)

This invention relates to bearing units, and more particularly to units of the kind which are adapted to be secured to a damper for rotatably mounting the damper in a fluid transmitting duct.

The invention is particularly intended for mounting dampers in flues and in ventilating or air conditioning ducts. Such ducts are commonly either circular or rectangular in cross-section and may be deformed to a limited extent for facilitating the insertion and emplacement of a damper with a single protruding bearing unit attached. An installation, however, requires that a plurality of aligned bearing members be attached to the damper to project beyond opposite edges of the damper, so that stable pivotal mounting of the damper may be secured by lodging the bearing members in openings formed in opposite sides of the duct. It is not feasible to insert a damper with two aligned and opposed, projecting bearing members fixed in place.

It is an object of the present invention to provide a bearing unit of the kind which includes a retractible bearing pin, and which may be attached to a damper prior to the installation of the damper in a duct, the bearing pin being adapted to be held retracted or partially retracted during the insertion of the damper in the duct.

It is a more particular object to provide a bearing unit of the kind referred to which consists of few and simple parts, which admits of assembly in an extremely rapid, convenient and economical manner, and which is capable of performing its intended service efficiently and dependably.

To these ends it is a salient feature of the invention that a bearing unit is provided which comprises an attaching and supporting plate having opposed inner and outer bearing members, a retractible bearing pin slidingly mounted in the openings of the bearing members, and a compression coil spring disposed between the bearing members and surrounding the pin for projecting the pin outward, the pin being formed with a circumferentially extending groove, and the spring having the outermost turn thereof of smaller diameter than the other turns and lodged in the groove, but of large enough diameter to project partially beyond the circumference of the pin to form an abutment for engaging the outer bearing member to limit outward movement of the pin.

Other objects and advantages will hereinafter appear.

In the drawing forming part of this specification and illustrating a practical and advantageous embodiment of the invention:

Figure 1 is a fragmentary, sectional view of a duct having a damper therein, and includes a damper bearing embodying features of the invention;

Figure 2 is a fragmentary, sectional view taken upon the line 2—2 of Figure 3;

Figure 3 is a fragmentary, detail view in elevation, showing the improved bearing unit of the present invention;

Figure 4 is a fragmentary, sectional view taken upon the line 4—4 of Figure 3 looking in the direction of the arrows; and Figure 5 is a fragmentary, sectional view taken upon the line 5—5 of Figure 4 looking in the direction of the arrows, the view being on a larger scale than Figures 2 to 4.

A duct 1 is shown in Figure 1 as having a damper blade 2 mounted in it. The damper blade 2 has affixed to it a stem or bearing member 3, which extends permanently beyond one edge of the damper and through a hole 4 formed in the upper duct wall. The stem 3 is square and is designed to pass through a dial plate 5 and to cooperate with a handle 6 mounted upon the upper side of the duct. The dial plate and handle structure are desirably of the construction disclosed in Letters Patent of the United States No. 2,129,505, for Damper control device, granted to me on September 6, 1938.

The damper blade 2 also has affixed to it a bearing unit 7, which includes a bearing pin 8 in the form of a retractible plunger. The bearing pin 8 is passed through a circular opening 9 in the lower wall of the duct 1 and is mounted upon the damper blade in position to be in alignment with the stem or bearing member 3.

The bearing pin 8 is carried by a one-piece, sheet metal, attaching and supporting plate 10. The plate 10 is formed with opposed upper and lower, parallel bearing members or ears 11 and 12, which are bent at right-angles from the main body of the plate, and formed with aligned openings in which the pin is rotatably and slidably mounted. Wing portions of the plate have perforations formed in them for the reception of suitable fastening members such as rivets 13, whereby the attaching plate is secured to the damper 2. The bearing pin has one or more lugs 14, (two as illustrated) which are desirably integral with the pin, and which may be formed by applying deforming pressure to portions of the pin. The bearing pin 8 has a knurled head 15 which may be used for rotating the pin and for pulling it lengthwise when it is desired to withdraw the pin to a retracted position.

The bearing pin 8 is also provided with a circumferential groove 16 in which the smallest, lowermost turn 17 of a tapering coil spring 18 is adapted to be lodged. The spring 18 is of large enough diameter at its upper end to extend around the lugs 14 without interfering with the free movement of the lugs. While the spring is of substantially open construction throughout the major portion of its length, a few of the turns 19 at the extreme inner or upper end of the spring are disposed in contiguous relation, or substantially contiguous relation, to one another, so that the lugs 14 cannot by any chance become lodged between turns of the spring. The upper end of the spring 18 always bears against the lower face of the inner ear 11. The spring transmits pressure to the bearing pin through the lower turn 17 of the spring which is lodged in the groove 16. With the exception of the lower turn 17, all of the turns of the spring are of large enough diameter to permit the bearing pin to pass freely through them.

The lowermost turn 17 of the spring, which is seated in the groove 16, is disposed to have its outer portion projecting outward beyond the normal circumference of the bearing pin so that this lowermost turn forms an end abutment for engaging the outer ear 12, and for serving as a stop to limit outward movement of the bearing pin 8.

Each of the ears 11 and 12 is formed with two diametrically opposed notches 20. When the bearing unit is fully assembled, only the notches of the upper ear 11 serve any purpose. The purpose of providing the notches is to permit the lugs 14 to pass upward through the upper ear 11 so that the bearing pin can be withdrawn to a retracted position for inserting the damper into a duct. The lugs are provided so that the bearing pin can be secured in its projected position after the damper, with its attached bearings, has been put into place. Thus, when the pin 8 has been projected outward through the hole 9 of the duct 1, the operator simply gives a partial turn to the knurled head of the pin 8 so as to locate the lugs 14 out of alignment with the notches in the upper ear 11.

It has been mentioned that both the ears 11 and 12 are formed with two notches, notwithstanding the fact that the notches in the ear 12 perform no function after the device is assembled. The importance of this symmetry of construction of the attaching plate resides in its usefulness at the assembling operation. If only one ear were notched, then the assembler might pick up a bearing plate with the notched ear toward him or with the unnotched ear toward him. On the average, he would pick up the plate wrong half the time, and would have to turn it over. He would, moreover, be required to examine every plate that he picks up with a view to discriminating between the two ends of it. By making the ears 11 and 12 exact duplicates of one another, the assembly is made very much more convenient, efficient and economical. Whichever end the assembler turns up will be right, so that no discrimination is required of him, and no turning of the plate is necessary.

The general method of assembly of the bearing unit 7 will be readily apparent from the foregoing description of the parts. The spring 18 is first placed between the ears 11 and 12. The pin is then passed through the ears and the spring to a position like that of Figures 1, 3 and 4. As soon as the groove 16 comes opposite the turn 17 of the spring, the turn 17 of the spring snaps into the groove so that the assembly is complete.

Each individual unit is attached to a damper blade 2 in the manner illustrated in Fig. 1. The operator retracts the pin so that its lower extremity stands substantially flush with the lower face of the lower ear 12 while starting the damper into the duct. After the damper has been located within the duct, the pin 8 may be released by the operator, since the duct wall itself will prevent the pin 8 from springing outward to an interfering position. The damper is then manipulated until the pin 8 finds the opening 9 in the duct wall, whereupon the pin is snapped out through the opening 9 to a position like that illustrated in Figs. 2 and 3. The mechanic then turns the head 15 of the pin 8 to lodge the lugs 14 out of alignment with the notches 20 of the upper ear, so that the bearing pin is secured against accidental retraction.

I have described what I believe to be the best embodiments of my invention. I do not wish, however, to be confined to the embodiments shown, but what I desire to cover by Letters Patent is set forth in the appended claim.

I claim:

In a bearing unit, in combination, an attaching and supporting plate having opposed inner and outer bearing members formed with aligned openings, a retractible bearing pin slidingly and rotatively mounted in the openings of the bearing members, and a compression coil spring disposed between the bearing members and surrounding the pin for projecting the pin outward, said pin being formed with a circumferentially extending groove, and said spring having the outermost turn thereof of smaller diameter than the other turns and lodged in the groove, but of large enough diameter to project partially beyond the circumference of the pin to form an abutment for engaging the outer bearing member to limit outward movement of the pin.

HEYMAN ROSENBERG.